United States Patent [19]

Škrabak et al.

[11] 4,057,497

[45] Nov. 8, 1977

[54] METHOD AND APPARATUS FOR DISPENSING MULTICOMPONENT LIQUID SUSPENSIONS

[75] Inventors: Michal Skrabak; Ernest Vavrik; Stanislav Kolarik; Milos Mazak, all of Bratislava, Czechoslovakia

[73] Assignee: Slovenska vysoka skola technicka, Bratislava, Czechoslovakia

[21] Appl. No.: 628,881

[22] Filed: Nov. 5, 1975

Related U.S. Application Data

[63] Continuation-in-part of Ser. No. 499,789, Aug. 22, 1974, abandoned.

[51] Int. Cl.[2] ........................ B01D 21/00; B01D 37/00

[52] U.S. Cl. ................................ 210/65; 210/433 R; 222/564; 239/432

[58] Field of Search ........................ 222/145, 547, 564; 210/65, 433; 239/428, 432; 425/130, 131.1, 131.5

[56] References Cited

U.S. PATENT DOCUMENTS

| | | | |
|---|---|---|---|
| 580,109 | 4/1897 | Holmberg | 239/428 |
| 2,661,095 | 12/1953 | Koth | 210/433 |
| 2,758,553 | 8/1956 | Moser | 222/145 X |
| 2,762,318 | 9/1956 | Prouty | 222/145 |
| 3,265,313 | 8/1966 | Paris | 239/428 X |
| 3,716,614 | 2/1973 | Okamoto et al. | 425/131 X |
| 3,725,271 | 4/1973 | Giannotti | 210/65 |
| 3,743,143 | 7/1973 | Barney et al. | 222/145 |
| 3,825,383 | 7/1974 | Hoagland et al. | 425/131 |

*Primary Examiner*—Robert B. Reeves
*Assistant Examiner*—Francis J. Bartuska
*Attorney, Agent, or Firm*—Burgess, Ryan and Wayne

[57] ABSTRACT

Method and apparatus for dispensing multi-component liquids in suspension in which at least two nozzles are placed to direct two different liquid suspensions into each other at different flow rates to cause oscillation and turbulence at the boundary between the two streams.

2 Claims, 4 Drawing Figures

METHOD AND APPARATUS FOR DISPENSING MULTI-COMPONENT LIQUID SUSPENSIONS

Figure 1A:
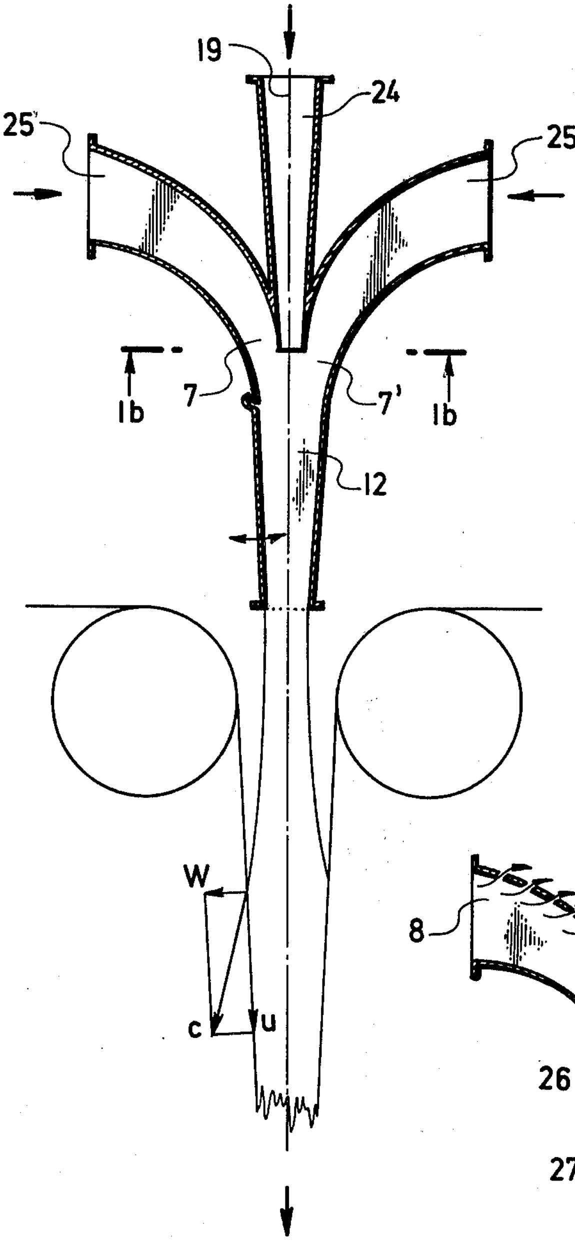

This application is a continuation-in-part of U.S. Ser. No. 499,789 filed Aug. 22, 1974 now abandoned.

Many chemotechnical processes in which liquid polydisperse suspensions of multi-component origin are treated require a reciprocally perfect dispersion and blending of the individual components. These are in particular processes in which gaseous or liquid materials are to be dispersed together or with solid, fibrous, or granular materials, or materials of a different origin.

One very important type of operation is the process of producing paper, cardboard, fiberboard and other products consisting of fibers. In this process, a polydisperse suspension in which different kinds of fibers and additions are dispersed must be placed upon the sieve which forms the molding part of the machine. These fibers and additions tend to agglomerate, that is, to flocculate and deflocculate. As a result, the quality of the product suffers. The perfection of this dispersion depends on the quality of the fiber cake, mainly its isotropy, and the physical properties of the finished product. This requirement becomes more important in modern high-production paper machines and in similar types of high speed apparatus. Here it is required that the carefully dispersed suspension be drained in the fraction of a second immediately after leaving the forward end of the machine and that it be felted so as to obtain uniform isometry in the cake.

For these reasons, care is taken in the construction of modern high speed paper and molding machines that the liquid suspension be prepared in special apparatus, the so-called "Anlaufen" or approach machine. Here the dispersion is generated by different chemical reactants or by mechanical or hydrodynamic means. The most effective means has hitherto proved to be a process based on the principle of a hydrodynamic turbulence generated in the suspension stream that flows from the nozzle of the forward end directly to the molding sieve of the paper machine. In this connection a whole series of forward ends and nozzles were developed for the flowing of the suspension stream. They were shaped as slots, pipes and chutes, both perforated and unperforated. A common feature of said forward ends is the formation of turbulence produced by the equal rate of flow of the suspension in the slots, pipes, or chutes of the outlet nozzles. Since the suspension stream flows from the pipes or chutes at the same rate determined by the speed of the molding sieve, the present forward ends are always fed exclusively from a single source.

A disadvantage of the existing forward ends in which the suspension flows at the same rate as the speed of the molding sieve from the chutes or pipes must be seen in the rheological phenomenon that occurs in fibrous suspensions. It makes itself noticeable because in the main stream, there always appears a higher consistency than on the passage wall. In the laminar layer or underlayer on the wall, a water layer forms or a very poor suspension is obtained so that upon leaving the nozzle edge narrow water streaks will appear between the interconnected suspension streams. To this must be added the unfavorable effect resulting from the speed distributions of the suspension flow in the chutes or pipes. But the degree and scope of the turbulence and blending of the suspension when it leaves the pipes or chutes is limited by the total volume of the converging space of the forward end. This quite clearly also limits the degree of turbulence when the stream leaves the forward end. This is the common disadvantage of all presently existing forward ends.

The proposed new process and apparatus for dispersing multi-component liquid suspensions that can be used in different technological operations overcome the stated disadvantages and substantially increase the degree of turbulence of the suspension. In accordance with this invention, the suspension flows always alternatively from two adjacent narrow nozzles disposed side by side with different rates of flow, the rate of flow $c_2$ (nozzle 2) being higher than the rate of flow $c_1$, (nozzle 1). Preferably, the difference in flow rates is achieved by utilizing different sources for the nozzles. The nozzles are arranged in two or more set that lie adjacent each other such that the rates of flow from adjacent nozzles are different. As a consequence of the differences in the rates of flow $c_1$ and $c_2$ and of the change of direction and of the effect of the centrifugal forces acting on these flows an intensive "free turbulence" is created at the point where the two streams meet. This is an oscillating movement of the elementary particles of the two suspensions which causes a more effective blending of the two suspensions in comparison to the conventional processes in which the suspensions flow out from all nozzles at the same rate. By the proposed process and the corresponding apparatus, use is made of hydrodynamic effects i.e. of the velocity jump at the border of the two streams at the point of discharge of the two adjacent streams. This occurs behind the sharp edges of the nozzles. The suspensions move at the common border in such a manner that the suspension that moves briskly is slowed down and the one that moves slowly is accelerated. Thus, there results an unstable movement characterized by pressure waves in transverse and longitudinal directions, which causes oscillation and turbulence. By gradual removal from the discharge edge of the nozzle, this range of turbulence is enlarged and at a certain distance from the nozzle, there results an intensive blending of the two suspensions not merely in their borders, but throughout the volume of the narrow streams that flow out from the chute-like or pipe-like systems at different speeds. The application of this hydrodynamic effect constitutes the main contribution of the new process and corresponding apparatus for obtaining the dispersion.

The apparatus for carrying out this process consists of reciprocally and alternatively arranging narrow nozzles or sets of nozzles for different rates of flow. The apparatus can be designed in different ways. The sets of nozzles can comprise, for both rates of flow, converging chutes oriented toward the main outlet nozzle and that can be combined to form interchangeable inserts or whole parts. The sets of nozzles can comprise two adjacent nozzles, each containing a plurality of tubes, lamellae or flat pipes narrowing at their downstream ends. The lamellae are corrugated and are oriented at a downstream end of a main outlet nozzle. Alternatively, the lamellae have their walls obliquely opposed to each other in the direction of the main outlet nozzle and thereby constitute a zigzagged space in the interior of the main outlet nozzle. In another embodiment, the apparatus comprises two symmetrical nozzles arranged opposite to each other and oriented toward the main outlet nozzle. Their upper curved walls are perforated and serve as draining segments to thicken the suspension. The liquid is drained off through a passage. The forward end can also comprise two sets of chutes oriented toward the main outlet nozzle and disposed on both sides inclined opposite to each other. They are alternatively offset so that the narrow nozzles in the central zone form a zigzag space in which the middle nozzle serves to feed an additional suspension discharges. To increase the mixing effect, the discharge edges of the narrow nozzles have an undulated zigzag shape so that blending takes place in the transverse direction. The discharge edges can be made of elastic sheet-like material and by hydrodynamic effect of the adjacent streams on their union points, they cause a shifting, oscillating movement. The discharges edges can be also oriented transversely with respect to the main outlet direction.

Figure 1B:
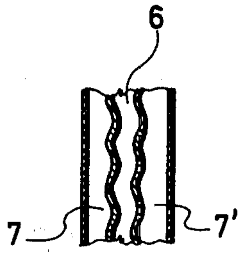
Figure 2:
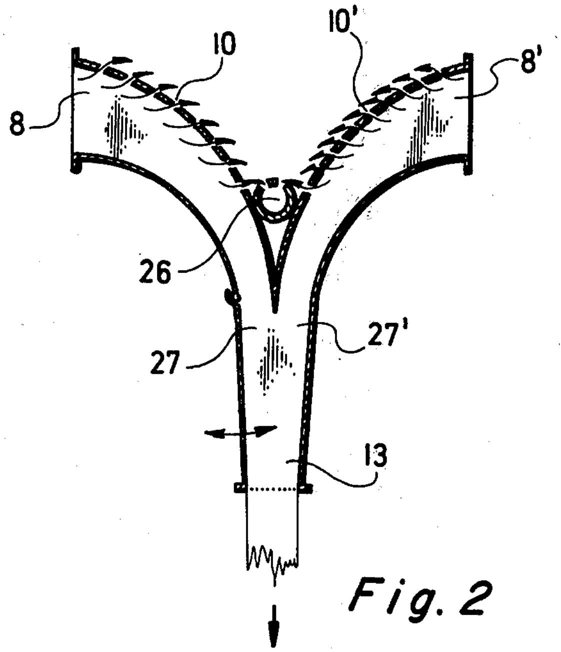
Figure 3:
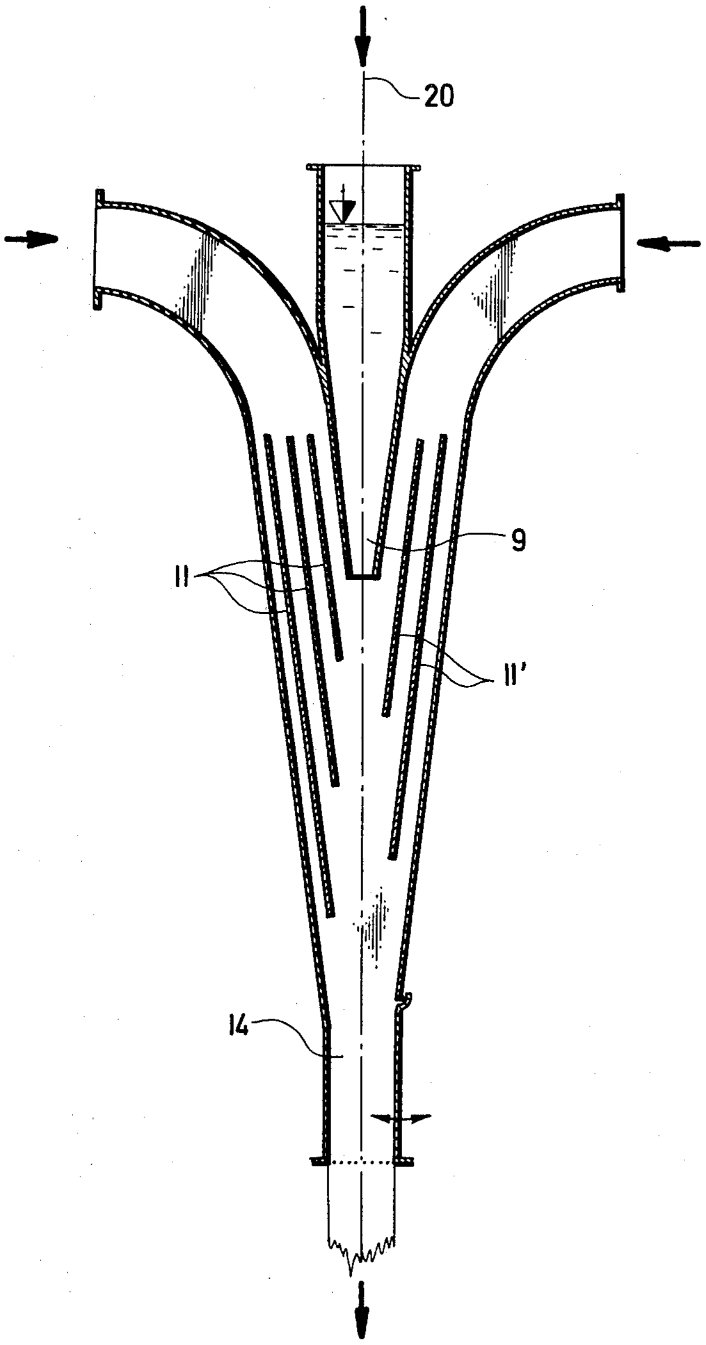

The proposed process and corresponding apparatus for dispersing multi-component liquid suspensions will be described according to the enclosed figures wherein like numerals refer to like parts and wherein:

FIG. 1*a* is a cross sectional view of a dispersing apparatus in accordance with the preferred embodiment of the invention;

FIG. 1*b* is a cross sectional view of a portion of the dispersing apparatus of FIG. 1*a*, taken along the cutting plane 1*b*—1*b*;

FIG. 2 is a cross sectional view of a dispersing apparatus according to an alternative embodiment of the invention; and FIG. 3 is a cross sectional view of the dispersing apparatus according to a further embodiment of the invention.

FIG. 1 shows a forward end in accordance with the instant invention comprising two symmetrical lateral nozzles 7 and 7' that feed into a main outlet nozzle 12 and are symmetrically arranged. From the middle nozzle 6, suspension can be fed into the main outlet nozzle 12 which can have a different pressure and be of a different type than the suspensions in nozzles 7 and 7'. The suspension having the highest concentration can be fed to the middle nozzle 6 through the nozzle 24 with a minor rate of flow $c_1$ and the suspension with a smaller concentration can be fed through the nozzles 25 and 25' from the two laterally opposite nozzles, with a major rate of flow $c_2$. With this apparatus, a multi-layered cake having a symmetrical structure can be produced.

FIG. 2 shows a forward end comprising two symmetric nozzles 8 and 8' oriented along the main outlet nozzle 13 and having in the upper curved portions perforated draining segments 10 and 10'. Here the suspension, such as a thick phase liquid is thickened before exiting from the nozzle. By the action of the centrifugal force in the middle zone, the liquid flows out through the passage 26 and the suspensions 27 and 27' remain undiluted in nozzle 13. In this manner, the suspension is thickened in the center of the cake, which is of special significance in the formation of fibrous layers between two vertical or differently arranged sieves.

FIG. 3 illustrates still another forward end. It comprises two sets of obliquely disposed sheets 11 and 11' oriented along the main outlet nozzle 14 and reciprocally offset so that a zigzag suspension stream results therebetween. In the center it is possible to feed, as it may be necessary, a second suspension from the central nozzle 9.

The proposed process and apparatus for dispersing one or more kinds of suspension with free turbulence at the border of two streams that flow at different rates from adjacent nozzles are suitable for use as forward ends of the new types of molding machines having two sieves and in particular for machines having a vertical converging sieve.

The process and apparatus for dispersing multi-component liquid suspensions can be used in the chemical industry, in the foodstuffs industry, and in the commodity industry for mixing, absorbing and dispersing in different operations.

What is claimed is:

1. A process for dispersing multi-component liquid suspensions, comprising passing at least two liquid suspension streams through adjacent nozzles at different velocities to form a mixed stream in a main outlet nozzle wherein the difference in velocity of the suspension streams, issuing from the adjacent nozzles is sufficient to cause a whirling and oscillating turbulence movement for dispersing the suspension streams, and lensifying the suspension before entering the main outlet nozzle, by centrifugal forces, acting on the outer perforated walls of a curved nozzle whereby a densified suspension is formed and withdrawing a filtrate through a take-off duct disposed at the end portion of the perforated walls.

2. Apparatus for dispersing multi-component liquid suspensions, comprising at least two adjacent nozzles coupled to a main outlet nozzle, said adjacent nozzles having within their cross sections a plurality of channels which extend into said outlet nozzle constituting a zigzag space in the interior of said outlet nozzle, said adjacent nozzles being arranged opposite each other and having curved and perforated walls oriented in the direction of said outlet nozzle, said walls forming draining segments for densifying the suspension and a draining duct for draining a filtrate therefrom.

* * * * *

UNITED STATES PATENT OFFICE
CERTIFICATE OF CORRECTION

Patent No. 4,057,497 Dated November 8, 1977

Inventor(s) Michal Skrabak, et al

It is certified that error appears in the above-identified patent and that said Letters Patent are hereby corrected as shown below:

In the title page, the Application No. should be --628,884--.

In the title, and at the top of column 1, "Dispensing" should read --Dispersing--.

In the Abstract, line 1: "dispensing" should be --dispersing--.

Column 2, line 16: "set" should be --sets--.

Column 3, line 7: "charges" should be --charge--.

Column 4, line 34: "lensifying" should be --densifying--.

Signed and Sealed this

*Eighteenth* Day of *April 1978*

[SEAL]

*Attest:*

RUTH C. MASON
*Attesting Officer*

LUTRELLE F. PARKER
*Acting Commissioner of Patents and Trademarks*